United States Patent
Wu et al.

(10) Patent No.: US 8,190,083 B2
(45) Date of Patent: May 29, 2012

(54) METHODS AND APPARATUS FOR COMMUNICATING IN A SYSTEM INCLUDING RELAY STATIONS

(75) Inventors: Xinzhou Wu, Monmouth Junction, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 12/273,002

(22) Filed: Nov. 18, 2008

(65) Prior Publication Data

US 2010/0124880 A1    May 20, 2010

(51) Int. Cl.
*H04B 3/36* (2006.01)
*H04B 7/14* (2006.01)
(52) U.S. Cl. .......... 455/7; 455/522; 455/11.1; 455/13.1; 455/13.4
(58) Field of Classification Search .................. None
See application file for complete search history.

(56) References Cited

U.S. PATENT DOCUMENTS

| | | | |
|---|---|---|---|
| 5,838,673 A | 11/1998 | Ritz et al. | |
| 6,078,815 A | 6/2000 | Edwards | |
| 7,075,909 B1 | 7/2006 | Iinuma | |
| 7,236,793 B2 * | 6/2007 | Amalfitano et al. | 455/453 |
| 2008/0032731 A1 * | 2/2008 | Shen et al. | 455/522 |
| 2008/0090575 A1 * | 4/2008 | Barak et al. | 455/444 |
| 2008/0171551 A1 * | 7/2008 | Zhu et al. | 455/450 |

FOREIGN PATENT DOCUMENTS

| | | |
|---|---|---|
| EP | 1006745 | 6/2000 |
| WO | WO9607287 | 3/1996 |
| WO | WO9844754 | 10/1998 |

OTHER PUBLICATIONS

International Search Report and Written Opinion—PCT/US2009/064386-ISA/EPO, Feb. 22, 2010.

\* cited by examiner

*Primary Examiner* — Tuan Pham
*Assistant Examiner* — Fanghwa Wang
(74) *Attorney, Agent, or Firm* — Sam Talpalatsky; Nicholas J. Pauley; Jonathan T. Velasco

(57) ABSTRACT

Methods and apparatus relating to communicating in a system including relay stations are described. Various described methods and apparatus are directed to improved performance and/or mitigating interference in relay station boundary areas. Relay station transmission power is controlled based on at least one of time or frequency such that a transmission power level for a frequency is varied in a predetermined manner with time or such that different transmission power levels are used for different carrier frequencies. Different adjacent relay stations are intentionally configured to use different transmission power levels for the same carrier and/or have different time varying transmission power level profiles for the same carrier. A relay station performs access terminal scheduling based on access terminal location with respect to relay station boundary regions and transmission power level information.

20 Claims, 10 Drawing Sheets

METHODS AND APPARATUS FOR COMMUNICATING IN A SYSTEM INCLUDING RELAY STATIONS

FIELD

Various embodiments relate to wireless communications, and more particularly, to methods and apparatus related to relay stations.

BACKGROUND

In a cellular wireless communications system, there are typically performance degradation issues at cell boundary regions due to inter-cell interference in a dense deployment. For example, in a typical dense cellular deployment, 35% of the mobiles have close or below 0 dB SNR due to interference from adjacent cells. One approach which attempts to improve performance at the cell boundary regions is to incorporate multiple relay stations which relay signals between base stations and access terminals. The use of multiple relay stations can provide some improvement in the cell boundary regions. However, the improvement is limited due to the introduction of relay station boundary regions into the system where the inter-relay-station interference can cause performance degradation in a similar fashion to inter-cell interference.

Based on the above discussion there is a need for new methods and apparatus which can improve performance in a wireless communications system including relay stations. Methods and apparatus directed to the mitigation of interference in relay station boundary regions would be beneficial.

SUMMARY

Methods and apparatus relating to relay stations in a wireless communications system are described. Each relay station is associated with a corresponding base station, and a relay station relays data and information between its base station and access terminals. Various methods and apparatus are directed to mitigating interference in relay coverage area boundaries to improve the performance of a wireless communications system.

A first relay station, in some embodiments, supports transmission on multiple carriers and uses different transmission power levels for transmissions to access terminals on the different carriers. The first relay station is part of a communications system including a second relay station, adjacent said first relay station. The second relay station also supports transmission on multiple carriers and uses different transmission power levels for transmissions to access terminals on different carriers. The first relay station and the second relay station have different predetermined carrier/power level relationships. For example, the first relay station transmits on carriers (F1, F2, F3) at power levels (P1, P2, P3), respectively, where P1<P2<P3, and the second relay station transmits on carriers (F1, F2, F3) at power levels (P2, P3, P1), respectively. The first relay station makes scheduling decisions, regarding transmission to access terminals in its coverage region, based on whether or not an access terminal to be scheduled is situated in a relay coverage area boundary region. In some embodiments, the first relay station gives a preference to scheduling an access terminal situated in a relay coverage area boundary on a high power carrier over access terminals situated close to said first relay station. In some such embodiments, an access terminal in a relay coverage area boundary is more likely to be assigned to a high power carrier than is an access terminal in a non-boundary area.

A first relay station, in some embodiments, controls transmission power based on time such that for a given carrier the transmission power level is varied in a predetermined manner with time in accordance with a first profile. A second relay station, adjacent said first relay station, controls transmission power based on time such that for the same given carrier the transmission power level is varied in a predetermined manner with time in accordance with a second profile which is different from the first profile. The first and second profiles are coordinated such that at least some high power level intervals of the first profile correspond to lower power level intervals of the second profile. The first relay station makes scheduling decisions, regarding transmission to access terminals in its coverage region, based on whether or not an access terminal to be scheduled is situated in a relay coverage area boundary region. In some embodiments, the first relay station gives a preference to scheduling an access terminal situated in a relay coverage area boundary during a high power level time interval of the first profile. Thus in such an embodiment, an access terminal in a relay coverage area boundary is more likely to be scheduled during a high power interval than an access terminal in a non-boundary region.

An exemplary method of operating a relay station, in accordance with some embodiments, comprises: controlling transmission power based on at least one of time or frequency such that a transmission power level for a frequency is varied in a predetermined manner with time or such that different transmission power levels are used for different carrier frequencies; and transmitting a signal to be relayed using the controlled transmission power. An exemplary relay station, in accordance with some embodiments, comprises: at least one processor configured to: control transmission power based on at least one of time or carrier such that a transmission power level for a carrier is varied in a predetermined manner with time or such that different transmission power levels are used for different carrier frequencies; and transmit a signal to be relayed using the controlled transmission power; and memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
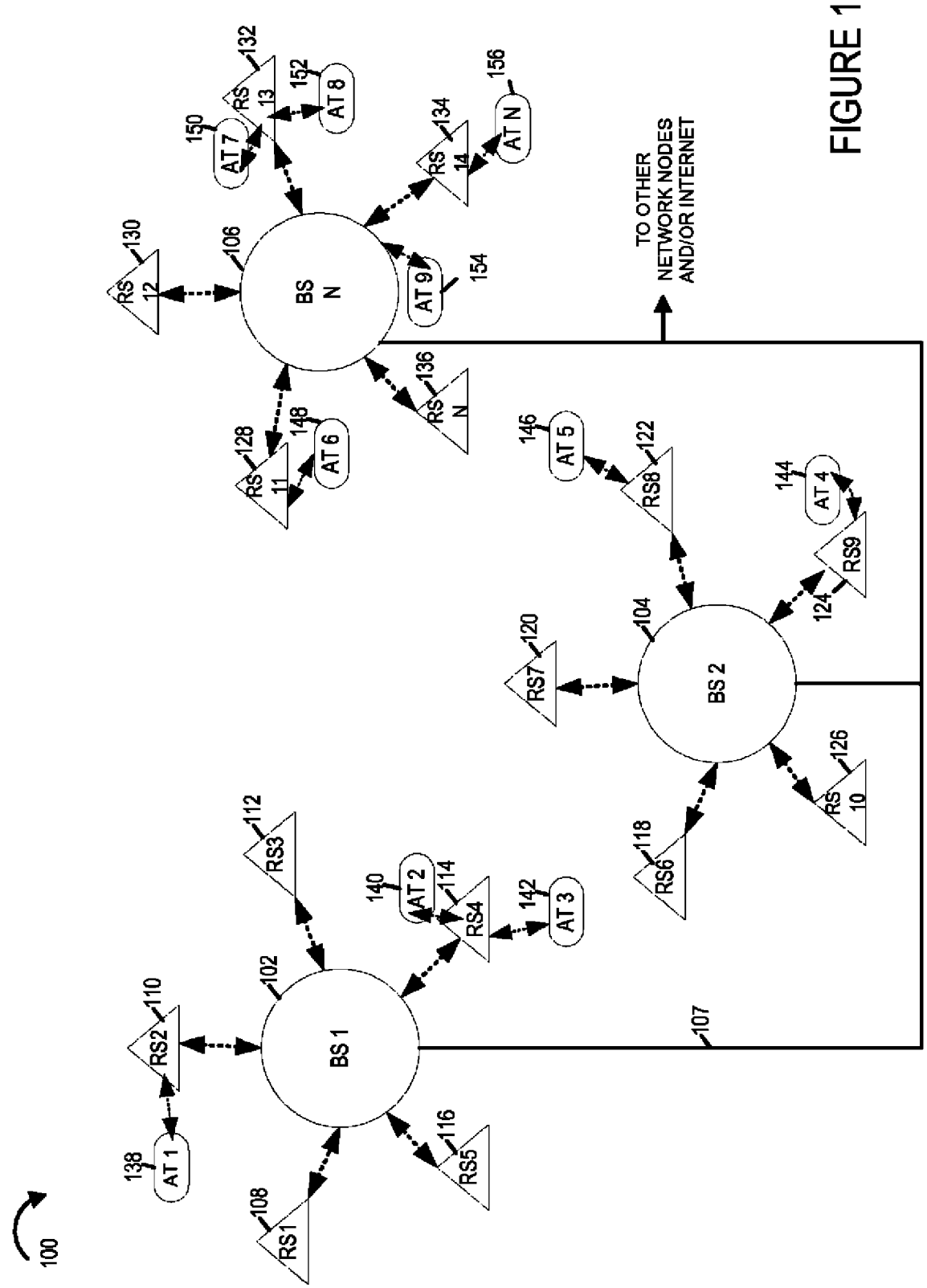
FIG. 1 is a drawing of an exemplary wireless communications system including relay stations in accordance with an exemplary embodiment.

FIG. 1 is a drawing of an exemplary wireless communications system 100 including relay stations in accordance with an exemplary embodiment. Exemplary wireless communications system 100 includes a plurality of base stations (BS 1 102, BS 2 104, . . . , BS N 106) coupled together via a backhaul network 107. In some embodiments, system 100 includes at least some sectorized base stations.

Exemplary communications system 100 also includes a plurality of relay stations (RS 1 108, RS 2 110, RS 3 112, RS 4 114, RS 5 116, RS 6 118, RS 7 120, RS 8 122, RS 9 124, RS 10 126, RS 11 128, RS 12 130, RS 13 132, RS 14 134, . . . , RS N 136. Each relay station is associated with a base station. In some embodiments, a relay station is associated with a sector of a base station. In this example, relay stations (RS 1 108, RS 2 110, RS 3 112, RS 4 114, and RS 5 116) are relay stations of base station 1 102; relay stations (RS 6 118, RS 7 120, RS 8 122, RS 9 124, and RS 10 126) are relay stations of base station 2 104; relay stations (RS 11 128, RS 12 130, RS 13 132, RS 14 134, and RS N 136) are relay stations of base station N 106.

Exemplary system 100 also includes a plurality of access terminals, e.g., wireless terminals such as mobile nodes, (AT 1 138, AT 2 140, AT 3 142, AT 4 144, AT 5 146, AT 6 148, AT 7 150, AT 8 152, AT 9 154, . . . , AT N 156). At least some of the access terminals are mobile communications devices which may move throughout the system 100 and have a wireless communications link with a relay station and/or base station in its current local vicinity.

A relay station controls transmission power, e.g., regarding transmissions of at least some types of signals to access terminals, based on at least one of time or frequency such that a transmission power level for a frequency is varied in a predetermined manner with time or such that different transmission power levels are used for different carrier frequencies; and transmits a signal to be relayed using the controlled transmission power. For example, the relayed signal is a traffic signal received from a base station which is relayed via a relay station to an access terminal.

In one variation a relay station has multiple, e.g., three, carrier frequencies used for signaling to access terminals; each carrier is associated with a different power level, and the different power levels are different from one another by at least 2 dBs. In some such embodiments, within system 100 at least some physically adjacent relay stations use different transmission power levels for the same set of carriers.

In another variation a relay station has multiple, e.g., three, carrier frequencies, used for signaling to access terminals; the transmission power level of each carrier is varied over time in accordance with a predetermined pattern with different carriers having different power level vs time predetermined patterns. In some embodiments, at least some physically adjacent relay stations use different predetermined patterns for the same carrier.

A relay station, in some embodiments, makes scheduling decisions for access terminals which are using it as a point of attachment and which are to receive data. Features related to scheduling preferences will now be described.

In some embodiments, a relay station provides, for access terminals at relay coverage area boundaries, a greater carrier scheduling preference for a high power carrier than is provided for access terminals away from relay coverage area boundaries. For example, consider that AT 2 140 and AT 3 142 are currently connected to relay station 4 114, and that relay station 4 114 has multiple carriers, each associated with a different transmission power level, and the multiple carriers includes a higher power carrier. Further consider that AT 3 142 is near a relay coverage area boundary between relay station 4 114 and relay station 6 118, and that AT 2 140 is away from a relay coverage area boundary. In such a situation, relay station 4 114 gives preference to AT 3 142 with regard to scheduling on its high power carrier.

In some embodiments, a relay station provides a scheduling preference for access terminals at relay coverage area boundaries over access terminals away from relay coverage area boundaries when a transmitter is controlled to use a high power level. For example, consider that AT 7 150 and AT 8 152 are currently connected to relay station 13 132, are currently associated with the same carrier, and the transmission power of the carrier is varied over time in accordance with a predetermined pattern. Further consider that AT 8 152 is near a relay coverage area boundary between relay station 13 132 and relay station 14 134, and that AT 7 150 is away from a relay coverage are boundary. In such a situation, when the transmission power associated with the carrier is being controlled to use a high transmission power level, relay station 13 132 gives a preference to AT 8 152 in scheduling.

In some embodiments, a relay station controls transmission power for signaling from the relay station to its base station differently than for transmissions from the relay station to access terminals. For example, a relay station, in some embodiments, uses different transmission power levels for different carriers for signaling to access terminals but uses the same transmission power level for transmission to its base station irrespective of the carrier. As another example, a relay station, in some embodiments, varies transmission power level over time in accordance with a predetermined pattern for transmissions to access terminals on a particular carrier, but uses a fixed power level for transmission from the relay station to its base station.

Figure 2:
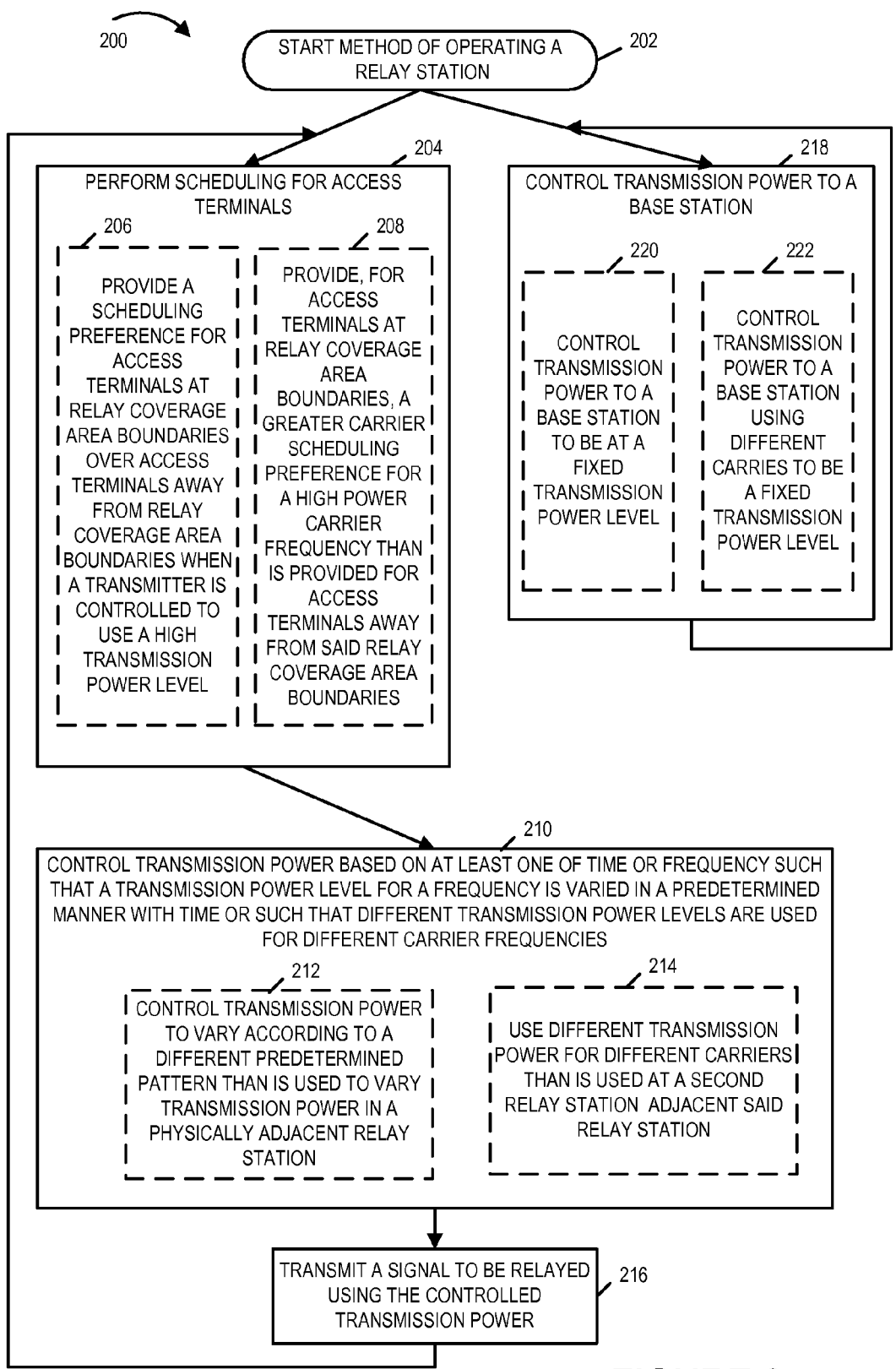
FIG. 2 is a flowchart of an exemplary method of operating a relay station in a wireless communications system.

FIG. 2 is a flowchart 200 of an exemplary method of operating a relay station in accordance with an exemplary embodiment. The relay station is, e.g., one of the relay stations of system 100 of FIG. 1. Operation starts in step 202, where the relay station is powered on and initialized and proceeds to steps 204 and step 218.

In step 204 the relay station performs scheduling for access terminals. In some embodiments, step 204 includes one or more of sub-steps 206 and 208. In sub-step 206 the relay station provides a scheduling preference for access terminals at relay coverage area boundaries over access terminals away from relay coverage area boundaries when a transmitter is controlled to use a high transmission power level. In sub-step 208 the relay station provides, for access terminals at relay coverage area boundaries, a greater carries scheduling preference for a high power carrier frequency than is provided for access terminals away from relay coverage area boundaries. In some embodiments a relay coverage area boundary is an area in which an access terminal receiving signals transmitted at the same power level from two adjacent relay stations receives the signals at approximately the same signal strength, e.g., within 1 dB. Operation proceeds from step 204 to step 210.

In step 210 the relay station controls transmission power based on at least one of time or frequency such that a transmission power level for a frequency is varied in a predetermined manner with time or such that different transmission power levels are used for different carrier frequencies. In some embodiments, controlling transmission power includes controlling transmission power of different carriers to be different by at least 2 dBs. In some embodiments, controlling transmission power includes controlling transmission power of different carriers to be different by at least 3 dBs. In some embodiments, controlling transmission power includes controlling transmission power of different carriers to be different by at least 6 dBs. In various embodiments, the different carrier frequencies include at least three different frequencies.

In some embodiments, step 210 includes one or more of sub-steps 212 and 214. In sub-step 212 the relay station controls transmission power to vary according to a different predetermined pattern than is used to vary transmission power in a physically adjacent relay station. In sub-step 214 the relay station uses different transmission power for different carriers than is used at a second relay station adjacent said relay station. In various embodiments, steps 210 and 216 pertain to transmission from the relay station to one or more access terminals.

Operation proceeds from step 210 to step 216. In step 216 the relay station transmits a signal to be relayed using controlled transmission power. Operation proceeds from step 216 to step 204 for additional scheduling of access terminals.

Returning to step 218, in step 218, which is performed on an ongoing basis, the relay station controls transmission power to a base station. In some embodiments, step 218 includes one or more of sub-steps 220 and 222. In sub-step 220 the relay station controls transmission power to a base station to be at fixed transmission power. In some such embodiments including sub-step 220, controlling transmission power per step 210 is performed in said predetermined manner for transmission to access terminals but not for transmission to base stations.

In sub-step 222 the relay station controls transmission power to a base station using different carriers to be a fixed transmission power level. In some such embodiments including sub-step 222, controlling transmission power with regard to transmission to access terminals per step 210 includes using different transmission power levels for different carrier frequencies.

Figure 3:
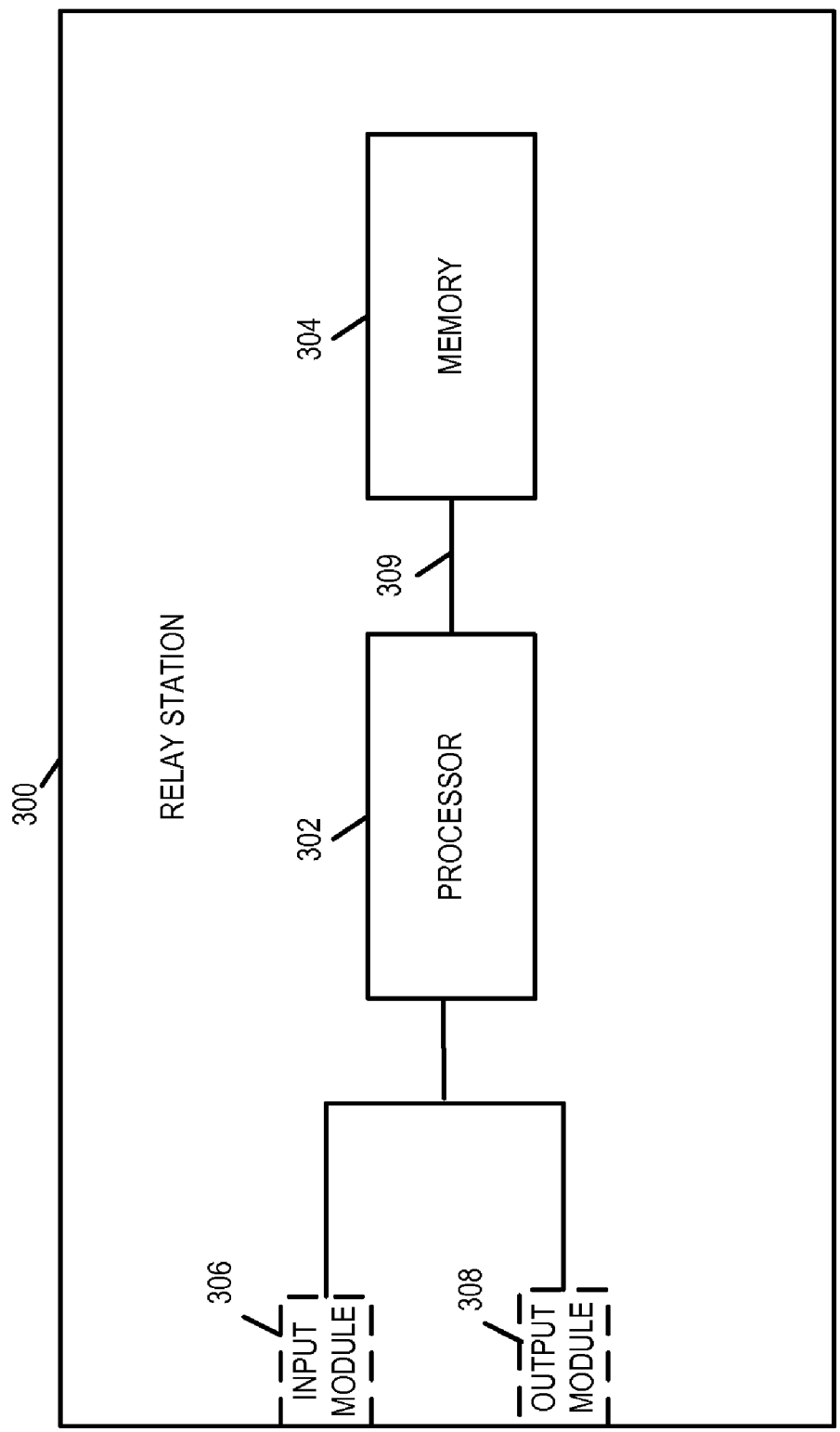
FIG. 3 is a drawing of an exemplary relay station in accordance with an exemplary embodiment.

FIG. 3 is a drawing of an exemplary relay station 300 in accordance with an exemplary embodiment. Relay station 300 is, e.g., one of the relay stations of system 100 of FIG. 1. Exemplary relay station 300 is, e.g., a relay station implementing a method in accordance with flowchart 200 of FIG. 2.

Relay station 300 includes a processor 302 and memory 304 coupled together via a bus 309 over which the various elements (302, 304) may interchange data and information. Relay station 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: control transmission power based on at least one of time or frequency such that a transmission power level for a frequency is varied in a predetermined manner with time or such that different transmission power levels are used for different carrier frequencies; and transmit a signal to be relayed using the controlled transmission power. In some embodiments, being configured to control transmission power includes being configured to control transmission power of different carrier frequencies to be different by at least 2 dBs. In some embodiments, the different carrier frequencies include at least three different frequencies. In various embodiments, being configured to control transmission power includes being configured to control transmission power to vary according to a different predetermined pattern than is used to vary transmission power in a physically adjacent relay station. In some embodiments, being configured to control transmission power includes being configured to use different transmission power for different carriers than is used at a second relay station adjacent to said relay station 300.

In some embodiments, processor 302 is configured to: provide a scheduling preference for access terminals at relay coverage area boundaries over access terminals away from said relay coverage area boundaries when a transmitter is controlled to use a high transmission power level. In various embodiments, processor 302 is configured to: provide, for access terminals at relay coverage area boundaries, a greater carrier scheduling preference for a high power carrier frequency than is provided for access terminals away from said relay coverage area boundaries.

Processor 302, in some embodiments, is configured to: control transmission to a base station to be at a fixed transmission power level, wherein controlling transmission power is performed in said predetermined manner for transmissions to access terminals but not for transmission to base stations. Processor 302, in some embodiments, is configured to: control transmission to a base station using different carriers to be at a fixed transmission power level, wherein controlling transmission power for signaling to access terminals includes using different power levels for different carrier frequencies.

Figure 4:
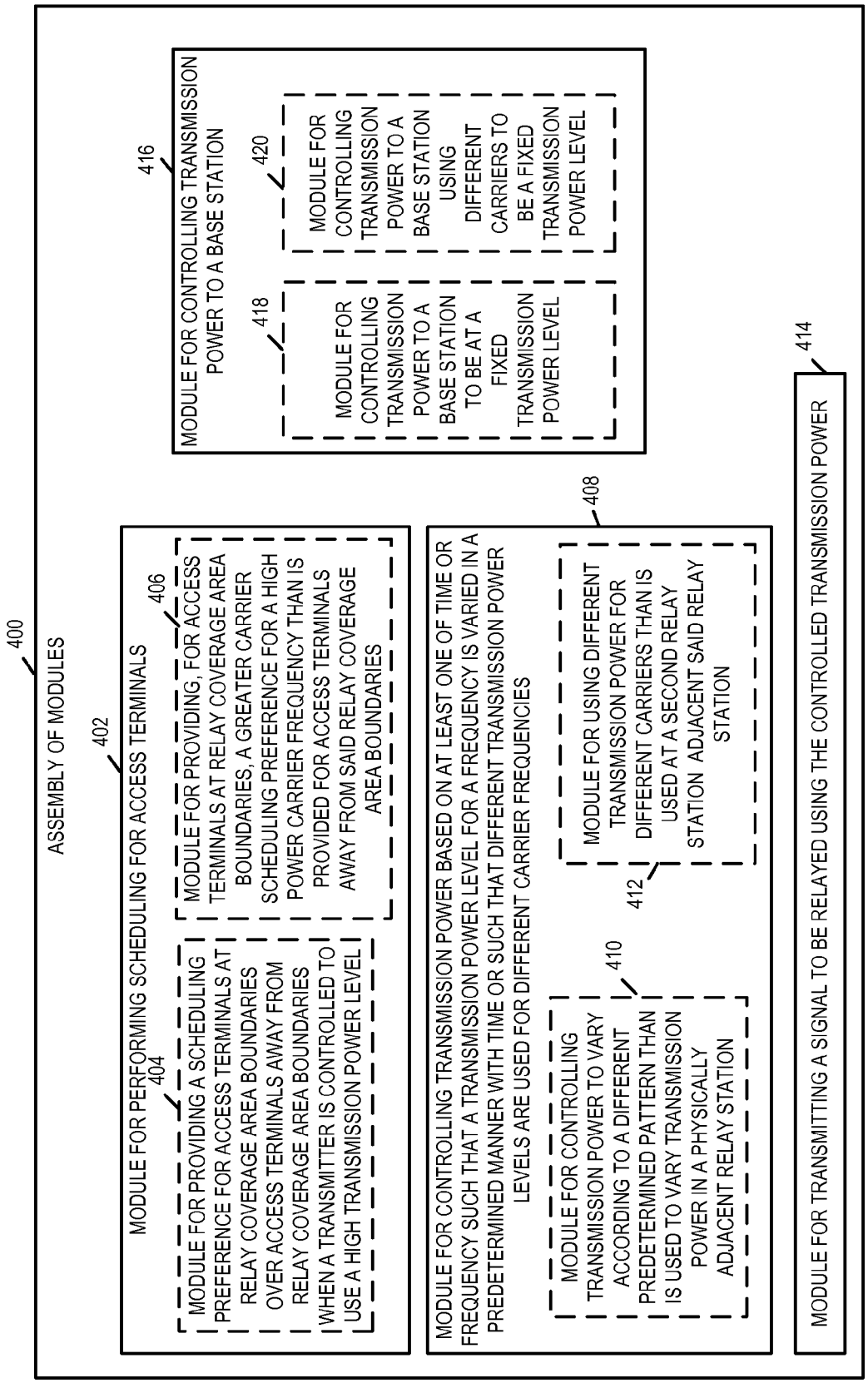
FIG. 4 is an assembly of modules which can, and in some embodiments are, used in the relay station illustrated in FIG. 3.

FIG. 4 is an assembly of modules 400 which can, and in some embodiments are, used in the relay station 300 illustrated in FIG. 3. The modules in the assembly 400 can be implemented in hardware within the processor 302 of FIG. 3, e.g., as individual circuits. Alternatively, the modules may be implemented in software and stored in the memory 304 of the relay station 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the relay station 300 or elements therein such as the processor 302, to perform the functions of the corresponding steps illustrated in the method flowchart 200 of FIG. 2.

As illustrated in FIG. 4, the assembly of modules 400 includes: a module 402 for performing scheduling for access terminals, a module 408 for controlling transmission power based on at least one of time or frequency such that a transmission power level for a frequency is varied in a predetermined manner with time or such that different transmission power levels are used for different carrier frequencies, a module 414 for transmitting a signal to be relayed using the controlled transmission power, and a module 416 for controlling transmission power to a base station. In some embodiments, the module 402 for performing scheduling for access terminals 402 includes one or more of a module 404 for providing a scheduling preference for access terminals at relay coverage area boundaries over access terminals away from relay coverage area boundaries when a transmitter is controlled to use a high transmission power level and a module 406 for providing for access terminals at relay coverage area boundaries a greater carrier scheduling preference for a high power carrier frequency than is provided for access terminals away form said relay coverage area boundaries.

Module 408 for controlling transmission power, in some embodiments, includes one or more of: a module 410 for controlling transmission power to vary according to a different predetermined pattern than is used to vary transmission power in a physically adjacent relay station; and a module 412 for using different transmission power for different carriers than is used at a second relay station adjacent said relay station. In various embodiments, module 408 controls transmission power of different carrier frequencies to be different by a least 2 dBs. In some such embodiments, the different carrier frequencies include at least three different frequencies.

Module 416 for controlling transmission power to a base station, in some embodiments, includes one or more of: module 418 for controlling transmission power to a base station to be at a fixed transmission power level and module 420 for controlling transmission power to a base station using different carriers to be a fixed transmission power level. In some embodiments including module 418, module 408 controls transmission power in said predetermined manner for transmissions to access terminals but not for transmission to base stations. In some embodiments, including module 420, module 408 controls transmission power using different power levels for different carrier frequencies for transmission to access terminals.

Figure 5:
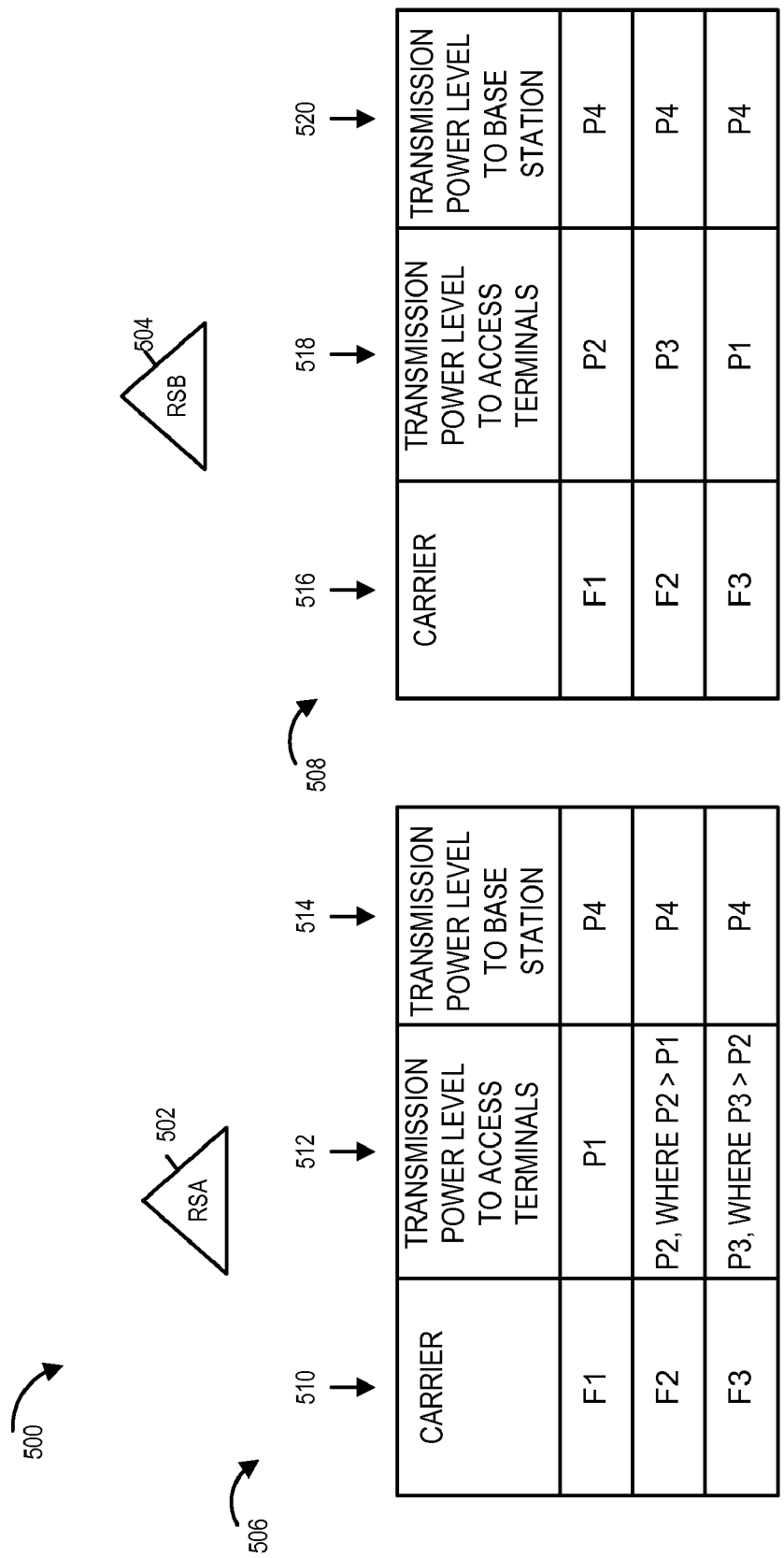
FIG. 5 is a drawing illustrating two exemplary adjacent relay stations and tables describing exemplary transmission power levels associated with the relay stations.

FIG. 5 is a drawing 500 illustrating two exemplary adjacent relay stations (relay station A 502, relay station B 504) and tables (506, 508) describing exemplary transmission power levels associated with the relay stations (502, 504), respectively. The exemplary adjacent relay stations (502, 504) are, e.g., two of the adjacent relay stations in system 100 of FIG. 1. The exemplary relay stations may correspond to the same base station or may correspond to different adjacent base stations. The exemplary relay stations (502, 504), in some embodiments implement a method in accordance with flowchart 200 of FIG. 2 and/or are implemented in accordance with exemplary relay station 300 of FIG. 3.

Table 506 which corresponds to relay station A 502 includes a first column 510 identifying carrier frequency, a second column 512 identifying transmission power level to access terminals, and a third column 514 identifying transmission power level to its base station. Relay station A 502 uses transmission power level P1 for transmissions to access terminals using carrier F1. Relay station A 502 uses transmission power level P2 for transmissions to access terminals using carrier F2, where P2 is greater than P1. Relay station A 502 uses transmission power level P3 for transmissions to access terminals using carrier F3, where P3 is greater than P2. In some embodiments, P2 is greater than P1 by at least 2 dBs, and P3 is greater than P2 by at least 2 dBs. Relay station A 502 uses power level P4 for transmissions to its base station irrespective of the carrier used. In some embodiments, when relay station A 502 is transmitting to its base station on a particular carrier, it does not concurrently transmit to access terminals on the same carrier. In some embodiments, transmission from the relay station to the base uses a different carrier frequency, e.g., F4, than transmissions from the relay station to access terminals.

Table 508 which corresponds to relay station B 504 includes a first column 516 identifying carrier frequency, a second column 518 identifying transmission power level to access terminals, and a third column 520 identifying transmission power level to its base station. Relay station B 504 uses transmission power level P2 for transmissions to access terminals using carrier F1. Relay station B 504 uses transmission power level P3 for transmissions to access terminals using carrier F2. Relay station B 504 uses transmission power level P1 for transmissions to access terminals using carrier F3. Relay station B 504 uses power level P4 for transmissions to its base station irrespective of the carrier used. In some embodiments, when relay station B 504 is transmitting to its base station on a particular carrier, it does not concurrently transmit to access terminals on the same carrier. In some embodiments, transmission from the relay station to the base uses a different carrier frequency, e.g., F4, than transmissions from the relay station to access terminals.

It should be appreciated that the intentional use of different transmission power levels corresponding to the same carrier for adjacent relay stations is beneficial in mitigating interference when the adjacent relay stations are concurrently transmitting on the same carrier to access terminals. Coordinated relay station transmission power levels in combination with intelligent selective access terminal scheduling can, and sometimes does, provide for increased throughput in the communications system. In some embodiments, the intelligent selective access terminal scheduling includes giving a preference in the scheduling decisions for an access terminal situated in a relay station boundary area to be scheduled to receive transmissions from its relay station using a high power carrier over an access terminal away from a relay station boundary.

Figure 6:
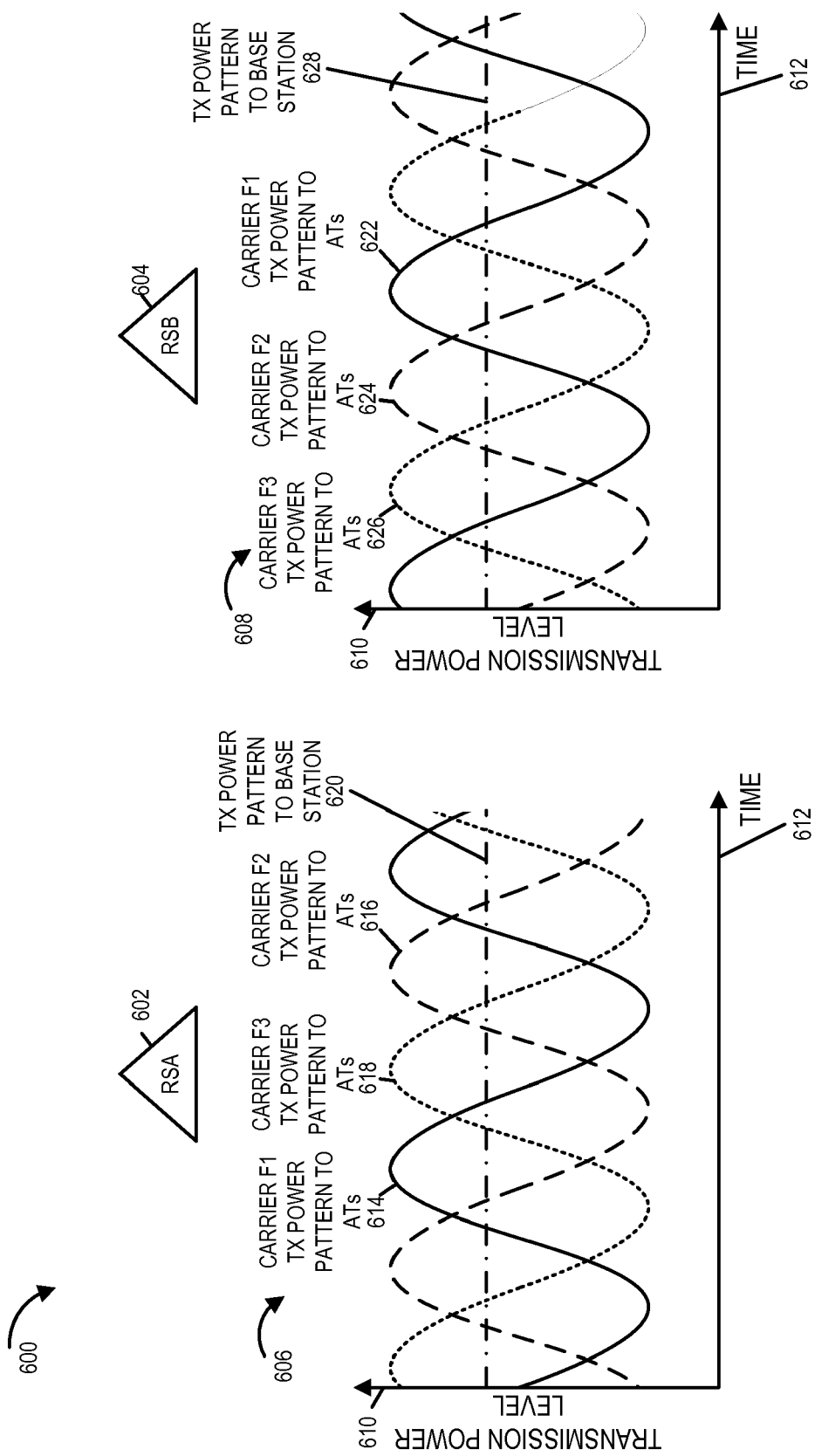
FIG. 6 is a drawing illustrating two exemplary adjacent relay stations and graphs describing exemplary transmission power level variations over time associated with the relay stations.

FIG. 6 is a drawing 600 illustrating two exemplary adjacent relay stations (relay station A 602, relay station B 604) and graphs (606, 608) describing exemplary transmission power level variations over time associated with the relay stations (602, 604), respectively. The exemplary adjacent relay stations (602, 604) are, e.g., two of the adjacent relay stations in system 100 of FIG. 1. The exemplary relay stations may correspond to the same base station or may correspond to different adjacent base stations. The exemplary relay stations (602, 604), in some embodiments implement a method in accordance with flowchart 200 of FIG. 2 and/or are implemented in accordance with exemplary relay station 300 of FIG. 3.

Graph 606, which corresponds to relay station A 602, includes vertical axis 610 representing transmission power level and horizontal axis 612 representing time. Graph 606 illustrates four exemplary power level variations over time. Curve 614, illustrated by a solid line, represents the transmission power level vs time plot corresponding to carrier F1 for the transmission power pattern for transmission from relay station A 602 to access terminals. Curve 616, illustrated by a dashed line, represents the transmission power level vs time plot corresponding to carrier F2 for the transmission power pattern for transmission from relay station A 602 to access terminals. Curve 618, illustrated by a dotted line, represents the transmission power level vs time plot corresponding to carrier F3 for the transmission power pattern for transmission from relay station A 602 to access terminals. Curve 620, illustrated by a dash-dot line, represents the transmission power level vs time plot corresponding to the transmission power pattern for transmission from relay station A 602 to its associated base station. In some embodiments, transmission from the relay station A 602 to its base station uses a different carrier frequency, e.g., F4, than transmissions from relay station A 602 to access terminals. In some embodiments, when relay station A 602 is transmitting to its base station on a particular carrier, it does not concurrently transmit to access terminals on the same carrier. In some embodiments, there are separate time intervals for transmissions from the relay station A 602 to access terminals and for transmissions from the relay station A 602 to its associated base station. In some such embodiments, the separate time intervals are non-overlapping.

Graph 608, which corresponds to relay station B 604, includes vertical axis 610 representing transmission power level and horizontal axis 612 representing time. Graph 608 illustrates four exemplary power level variations over time. Curve 622 illustrated by a solid line, represents the transmission power level vs time plot corresponding to carrier F1 for the transmission power pattern for transmission from relay station B 604 to access terminals. Curve 624, illustrated by a dashed line, represents the transmission power level vs time plot corresponding to carrier F2 for the transmission power pattern for transmission from relay station B 604 to access terminals. Curve 626, illustrated by a dotted line, represents the transmission power level vs time plot corresponding to carrier F3 for the transmission power pattern for transmission from relay station B 604 to access terminals. Curve 628, illustrated by a dash-dot line, represents the transmission power level vs time plot corresponding to the transmission power pattern for transmissions from relay station B 604 to its associated base station. In some embodiments, transmission from the relay station B 604 to its base station uses a different carrier frequency, e.g., F4, than transmissions from relay station B 604 to access terminals. In some embodiments, when relay station B 604 is transmitting to its base station on a particular carrier, it does not concurrently transmit to access terminals on the same carrier. In some embodiments, there are separate time intervals for transmissions from the relay station B 604 to access terminals and for transmissions from the relay station B 604 to its associated base station. In some such embodiments, the separate time intervals are non-overlapping.

It should be appreciated that the intentional use of different transmission power vs time profiles corresponding to the same carrier for adjacent relay stations is beneficial in mitigating interference when the adjacent relay stations are concurrently transmitting on the same carrier to access terminals. It may be observed that corresponding to a particular carrier, the transmission power level peaks occur at different points in time for the two different adjacent relay stations. Coordinated different relay station transmission power level profiles in combination with intelligent selective access terminal scheduling can, and sometimes does, provide for increased throughput in the communications system. In some embodiments, the intelligent selective access terminal scheduling includes giving a preference in the scheduling decisions to schedule an access terminal situated in a relay station boundary area to receive transmissions from its relay station during a time interval of high transmission power. Selection of carrier and/or selection of scheduling time, in some embodiments, are used as part of the intelligent selective access terminal scheduling.

Figure 7:
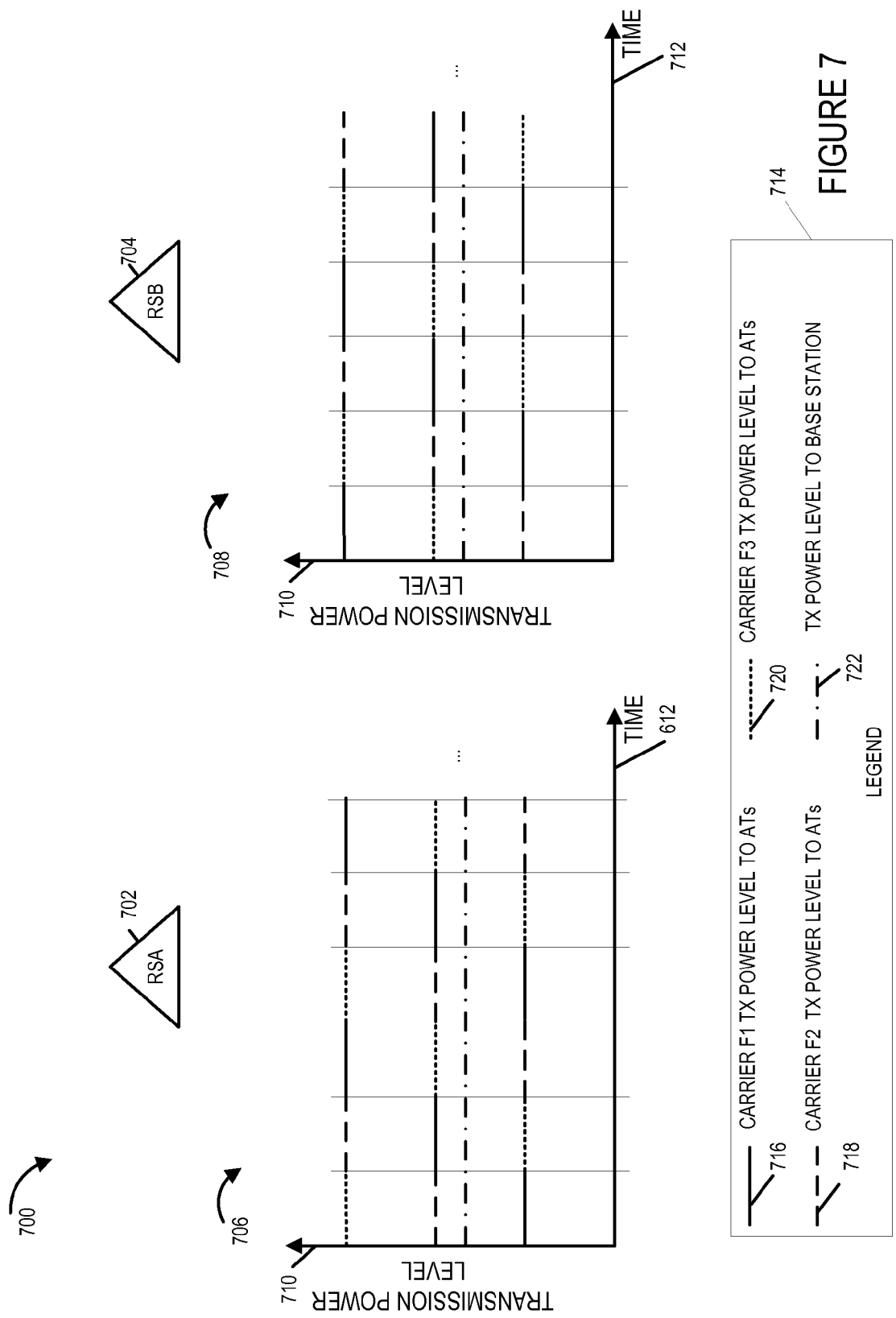
FIG. 7 is a drawing illustrating two exemplary adjacent relay stations and graphs describing exemplary transmission power level variations over time associated with the relay stations.

FIG. 7 is a drawing 700 illustrating two exemplary adjacent relay stations (relay station A 702, relay station B 704) and graphs (706, 708) describing exemplary transmission power level variations over time associated with the relay stations (702, 704), respectively. The exemplary adjacent relay stations (702, 704) are, e.g., two of the adjacent relay stations in system 100 of FIG. 1. The exemplary relay stations may correspond to the same base station or may correspond to different adjacent base stations. The exemplary relay stations (702, 704), in some embodiments implement a method in accordance with flowchart 200 of FIG. 2 and/or are implemented in accordance with exemplary relay station 300 of FIG. 3.

Graph 706, which corresponds to relay station A 702, includes vertical axis 710 representing transmission power level and horizontal axis 712 representing time. Legend 714 identifies that solid lines 716 are used to represent carrier F1 transmission power to access terminals, that dashed lines 718 are used to represent carrier F2 transmission power to access terminals, that dotted lines 720 are used to represent carrier F3 transmission power to access terminals, and that dash/dot lines 722 are used to represent transmission power to a base station. Graph 706, in view of the legend 714, illustrates four exemplary power level variations over time. In the example, of FIG. 7 a slotted approach is used to transmission power level variation with regard to transmissions from the relay station to access terminals, with the power level for a particular carrier remaining at a power level for a slot interval.

In some embodiments, transmission from the relay station A 702 to its base station uses a different carrier frequency, e.g., F4, than transmissions from relay station A 702 to access terminals. In some embodiments, when relay station A 702 is transmitting to its base station on a particular carrier, it does not concurrently transmit to access terminals on the same carrier. In some embodiments, there are separate time intervals for transmissions from the relay station A 702 to access terminals and for transmissions from the relay station A 702 to its associated base station. In some such embodiments, the separate time intervals are non-overlapping.

Graph 708, which corresponds to relay station B 704, includes vertical axis 710 representing transmission power level and horizontal axis 712 representing time. Legend 714, previously described is also applicable with regard to graph 708. Graph 708, in view of the legend 714, illustrates four exemplary power level variations over time.

In some embodiments, transmission from the relay station B 704 to its base station uses a different carrier frequency, e.g., F4, than transmissions from relay station B 704 to access terminals. In some embodiments, when relay station B 704 is transmitting to its base station on a particular carrier, it does not concurrently transmit to access terminals on the same carrier. In some embodiments, there are separate time intervals for transmissions from the relay station B 704 to access terminals and for transmissions from the relay station B 704 to its associated base station. In some such embodiments, the separate time intervals are non-overlapping.

It should be appreciated that the intentional use of different transmission power vs time profiles corresponding to the same carrier for adjacent relay stations is beneficial in mitigating interference when the adjacent relay stations are concurrently transmitting on the same carrier to access terminals. It may be observed that corresponding to a particular carrier, the transmission power level maximums occur at different time slots for the two different adjacent base stations. Coordinated different relay station transmission power level profiles in combination with intelligent selective access terminal scheduling can, and sometimes does, provide for increased throughput in the communications system. In some embodiments, the intelligent selective access terminal scheduling includes giving a preference in the scheduling decisions to schedule an access terminal situated in a relay station boundary area to receive transmissions from its relay station during a time interval of high transmission power. Selection of carrier and/or selection of scheduling time, in some embodiments, are used as part of the intelligent selective access terminal scheduling.

Figure 8:
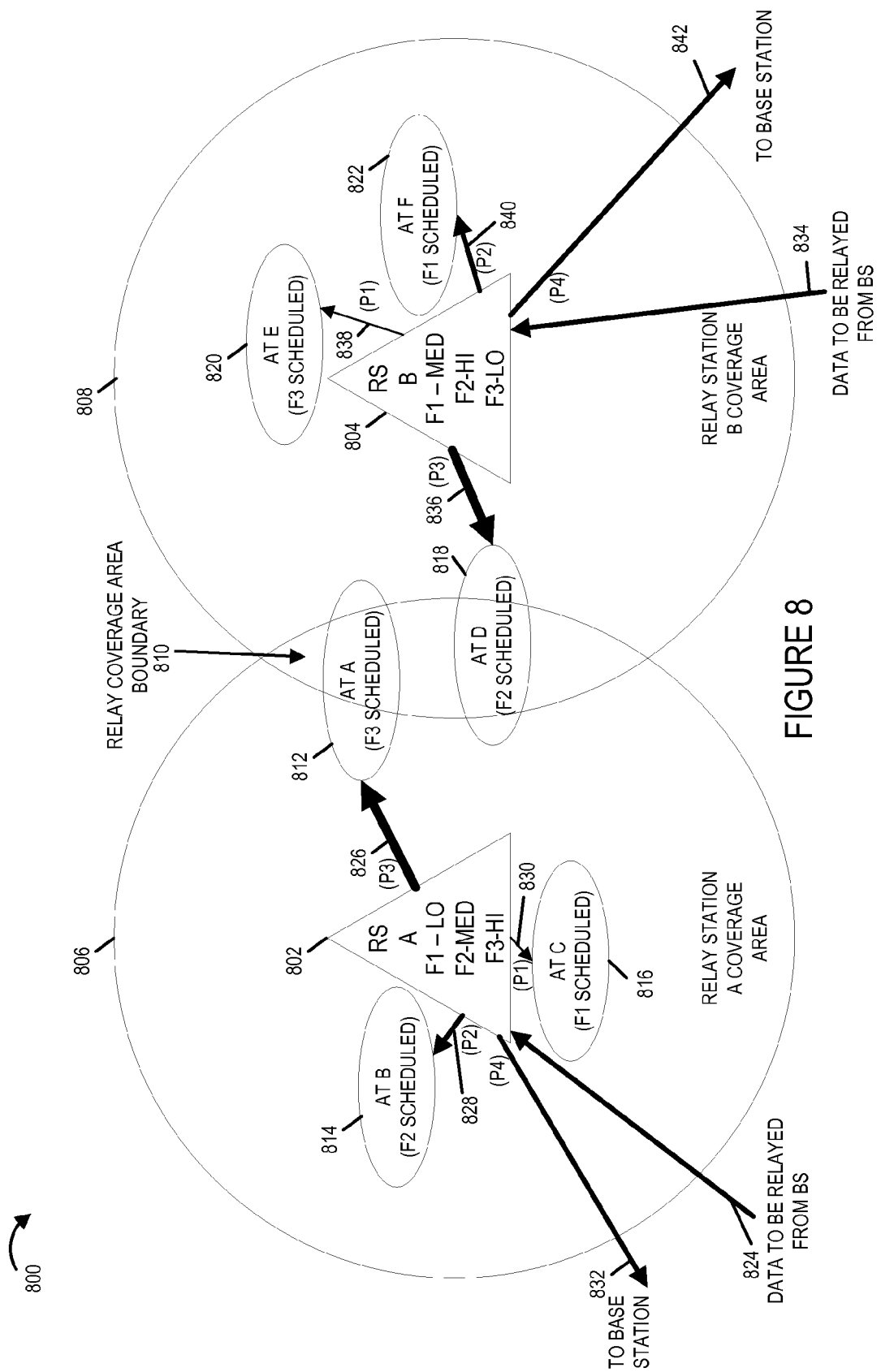
FIG. 8 illustrates an example where two adjacent relay stations use different transmission power levels for the same carrier and make access terminal scheduling decisions based on access terminal location with regard to relay coverage boundary areas.

FIG. 8 is a drawing 800 illustrating two exemplary adjacent relay stations (relay station A 802, relay station B 804) and a plurality of exemplary access terminals (access terminal A 812, access terminal B 814, access terminal C 816, access terminal D 818, access terminal E 820, access terminal F 822). Relay stations (802, 804) are, e.g., two adjacent relay stations of system 100 of FIG. 1. Relay stations (802, 804), in some embodiments, implement a method in accordance with flowchart 200 of FIG. 2 and/or are implemented in accordance with relay station 300 of FIG. 3. Each relay station (relay station A 802, relay station B 804) has a corresponding relay station coverage area (806, 808), respectively. There is also a relay coverage boundary area 810 illustrated in FIG. 8.

For the purposes of the example consider that relay station A 802 uses the transmission power level table 506 of FIG. 5, and that relay station B 804 uses the transmission power level table 508 of FIG. 5.

Further consider that access terminals (AT A 812, AT B 814, AT C 816) are currently connected to relay station A 802, while access terminals (AT D 818, AT E 820, AT F 822) are currently connected to relay station B 804. Signals 824 convey data from a base station intended to be communicated to AT A 812, AT B 814, and AT C 816. The data to be communicated is, e.g., a set of individual traffic segments with different members of the set directed to different ATs. Signals 834 convey data from a base station intended to be communicated to AT D 818, AT E 820, and AT F 822. The data to be communicated is, e.g., a set of individual traffic segments with different members of the set directed to different ATs.

The relay stations (802, 804) perform scheduling taking into consideration whether or not a particular access terminal using the relay station is in a relay coverage boundary region. When scheduling the access terminals, the relay stations (802, 804) give a preference to access terminals in a relay coverage boundary area with regard to using a high power carrier. In this example, relay station A 802 identifies that access terminal A 812 is in relay coverage boundary area 810 and schedules access terminal A 812 to use its high power carrier which is carrier F3. Relay station A 802 identifies that access terminal B 814 and access terminal C 816 are away from a relay coverage boundary area and schedules (AT B 814, AT C 816) on carriers (F2, F1), respectively. In this example, relay station B 804 identifies that access terminal D 818 is in relay coverage boundary area 810 and schedules access terminal D 818 to use its high power carrier which is carrier F2. Relay station B 804 identifies that access terminal E 820 and access terminal F 822 are away from a relay coverage boundary area and schedules (AT E 820, AT F 822) on carriers (F3, F1), respectively.

Relay station A 802 transmits signals (826, 828, 830) to access terminals (AT A 812, AT B 814, AT C 816) using carriers (F3, F2, F1) at power levels (P3, P2, P1), respectively. Relay station B 804 transmits signals (836, 838, 840) to access terminals (AT D 818, AT E 820, AT F 822) using carriers (F2, F3, F1) at power levels (P3, P1, P2), respectively.

Data transmitted from relay station A 802 to a base station is transmitted at power level P4 as indicated by signals 832. Data transmitted from relay station B 804 to a base station is transmitted at power level P4 as indicated by signals 842.

Figure 9:
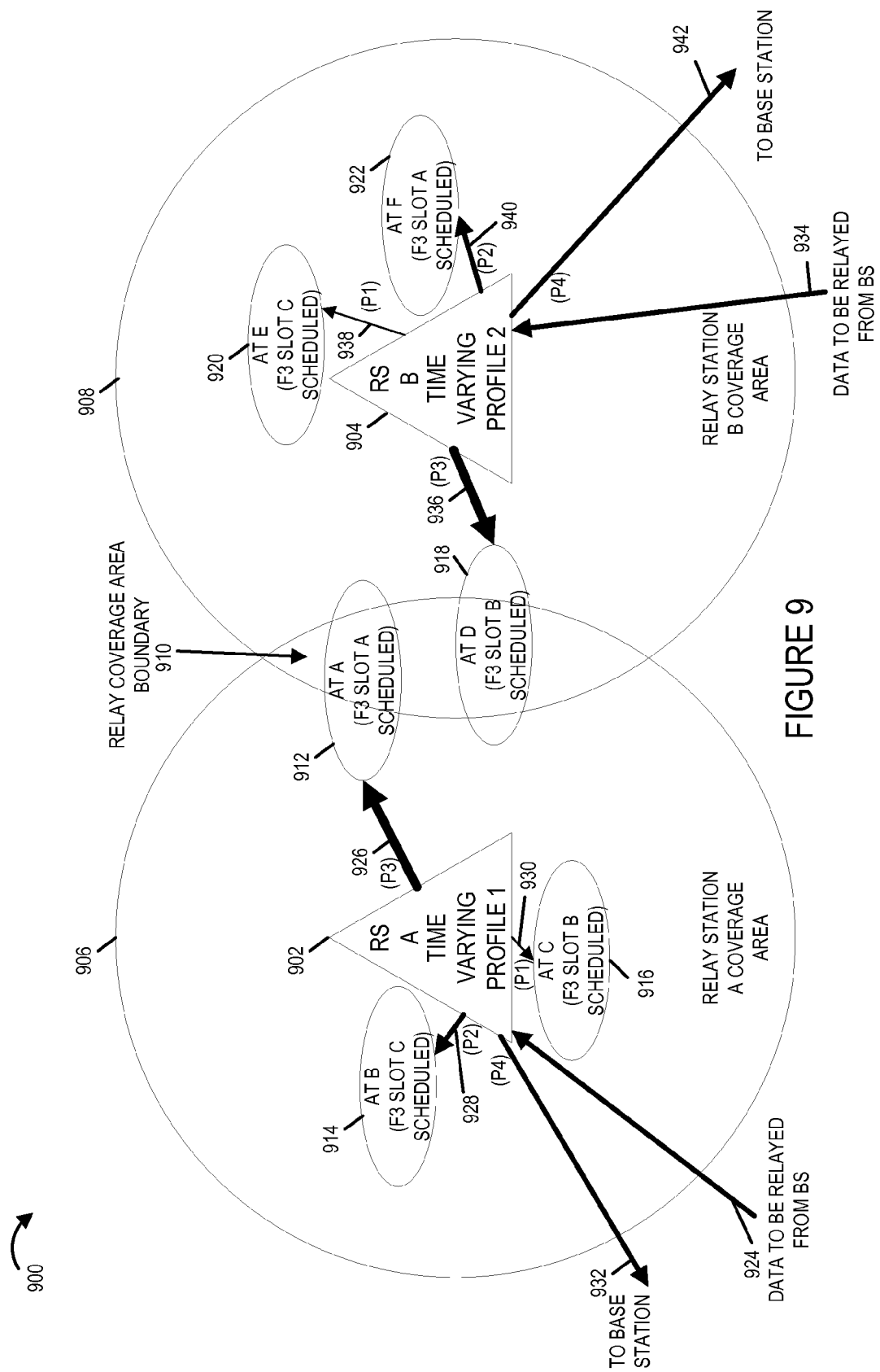
FIG. 9 is used in combination with FIG. 10 to illustrate an example where two adjacent relay stations use different time varying transmission power level profiles for the same carrier and make access terminal scheduling decisions based on access terminal location with regard to relay coverage boundary areas.
Figure 10:
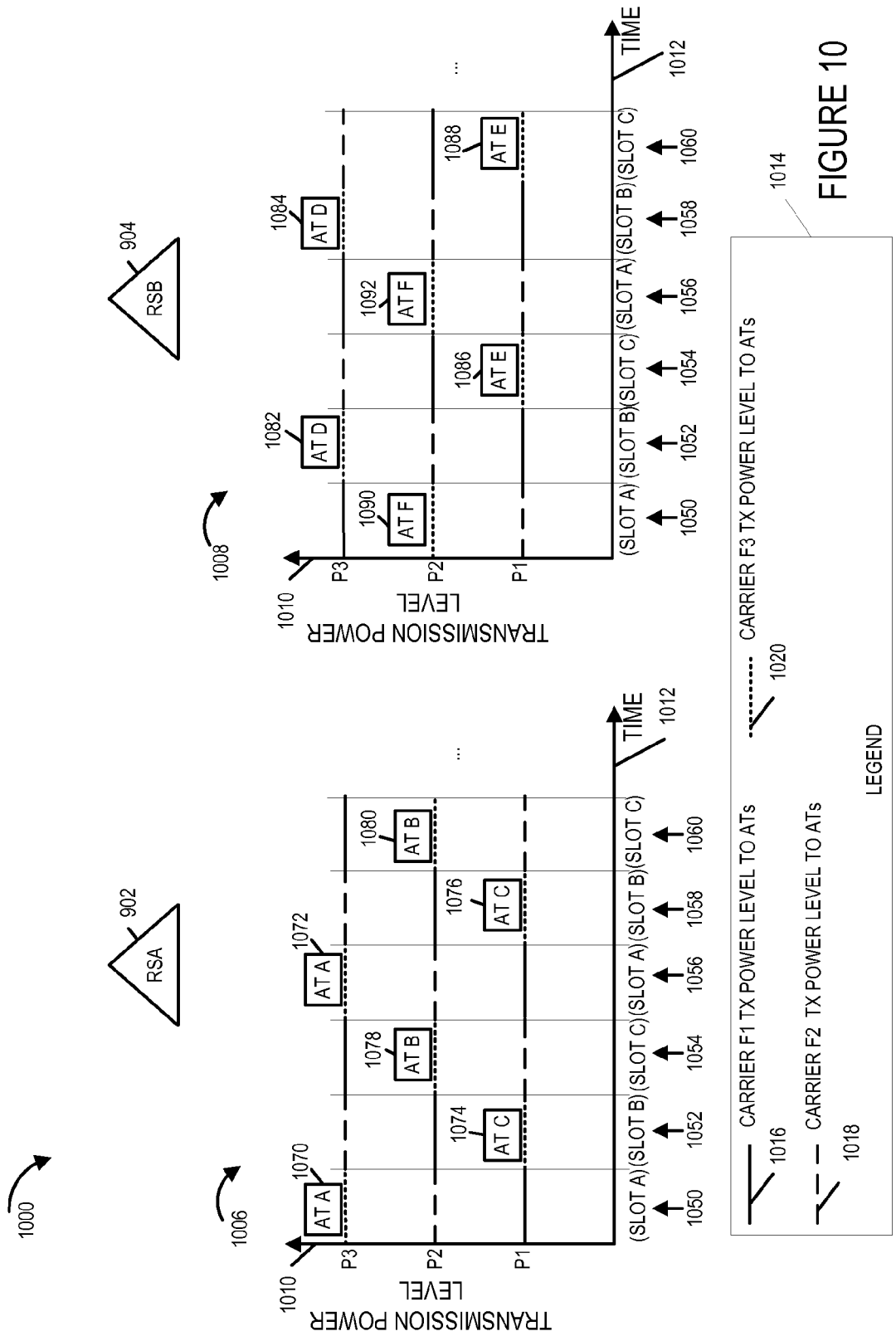
FIG. 10 is used in combination with FIG. 9 to illustrate an example where two adjacent relay stations use different time varying transmission power levels profiles for the same carrier and make access terminal scheduling decisions based on access terminal location with regard to relay coverage boundary areas.

FIG. 9 and FIG. 10 illustrate an example where two adjacent relay stations use different transmission time varying power levels profiles for the same carrier and make access terminal scheduling decisions based on access terminal location with regard to relay coverage boundary areas. FIG. 9 is a drawing 900 illustrating two exemplary adjacent relay stations (relay station A 902, relay station B 904) and a plurality of exemplary access terminals (access terminal A 912, access terminal B 914, access terminal C 916, access terminal D 918, access terminal E 920, access terminal F 922). Each relay station (relay station A 902, relay station B 904) has a corresponding relay station coverage area (906, 908), respectively. There is also a relay coverage boundary area 910 illustrated in FIG. 9. For the purpose of the example, consider that relay station A 902 uses the time varying transmission power level profile illustrated in graph 1006 of FIG. 10, and that relay station B 804 uses the time varying transmission power level profile illustrated in graph 1008 of FIG. 10.

Further consider that access terminals (AT A 912, AT B 914, AT C 916) are currently connected to relay station A 902 and are using carrier F3, while access terminals (AT D 918, AT E 920, AT F 922) are currently connected to relay station B 904 and are using carrier F3. Signals 924 convey data from a base station intended to be communicated to AT A 912, AT B 914, and AT C 916. The data to be communicated is, e.g., a set of individual traffic segments with different members of the set directed to different ATs. Signals 934 convey data from a base station intended to be communicated to AT D 918, AT E 920, and AT F 922. The data to be communicated is, e.g., a set of individual traffic segments with different members of the set directed to different ATs.

The relay stations (902, 904) perform scheduling taking into consideration whether or not a particular access terminal using the relay station is in a relay coverage boundary region. When scheduling the access terminals, the relay stations (902, 904) give a preference to access terminals in a relay coverage boundary area with regard to using a high transmission power slot. In this example, relay station A 902 identifies that access terminal A 912 is in relay coverage boundary area 910 and schedules access terminal A 912 to use the high power transmission power slots for carrier F3 which are the slots designated slot A. Relay station A 902 identifies that access terminal B 914 and access terminal C 916 are away from a relay coverage boundary area and schedules (AT B 914, AT C 916) to use slots (C, B) respectively, which are (medium power, low power) slots for carrier F3, respectively. In this example, relay station B 904 identifies that access terminal D 918 is in relay coverage boundary area 910 and schedules access terminal D 918 to use the high power transmission power slots for carrier F3 which are the slots designated slot B. Relay station B 904 identifies that access terminal E 920 and access terminal F 922 are away from a relay coverage boundary area and schedules (AT E 920, AT F 922) to use slots (C, A) respectively, which are (low power, medium power) slots for carrier F3, respectively.

Relay station A 902 transmits signals (926, 928, 930) to access terminals (AT A 912, AT B 914, AT C 916) using carrier F3 at power levels (P3, P2, P1), in slots (A, C, B), respectively, where P3>P2>P1. Relay station B 904 transmits signals (936, 938, 940) to access terminals (AT D 918, AT E 920, AT F 922) using carrier F3 at power levels (P3, P1, P2), in slots (B, C, A), respectively.

Data transmitted from relay station A 902 to a base station is transmitted at power level P4 as indicated by signals 932. Data transmitted from relay station B 904 to a base station is transmitted at power level P4 as indicated by signals 942.

FIG. 10 is a drawing 1000 illustrating the two exemplary adjacent relay stations (relay station A 902, relay station B 904) of FIG. 9 and graphs (1006, 1008) describing exemplary transmission power level variations over time associated with the relay stations (902, 904), respectively. The graphs (1006, 1008) further illustrate exemplary scheduling of access terminals to time slots. The exemplary adjacent relay stations (902, 904) are, e.g., two of the adjacent relay stations in system 100 of FIG. 1. The exemplary relay stations may correspond to the same base station or may correspond to different adjacent base stations. The exemplary relay stations (902, 904), in some embodiments implement a method in accordance with flowchart 200 of FIG. 2 and/or are implemented in accordance with exemplary relay station 300 of FIG. 3.

Graph 1006, which corresponds to relay station A 902, includes vertical axis 1010 representing transmission power level and horizontal axis 1012 representing time. Along time axis 1012 there are a number of time slots (first type A time slot 1050, first type B time slot 1052, first type C time slot 1054, second type A time slot 1056, second type B time slot 1058, second type C time slot 1060). Legend 1014 identifies that solid lines 1016 are used to represent carrier F1 transmission power to access terminals, that dashed lines 1018 are used to represent carrier F2 transmission power to access terminals, and that dotted lines 1020 are used to represent carrier F3 transmission power to access terminals. Graph 1006, in view of the legend 1014, illustrates three exemplary power level variations over time. In the example, of FIG. 10 a slotted approach is used to transmission power level variation with regard to transmissions from the relay station to access terminals, with the power level for a particular carrier remaining at a power level for a slot interval. In other embodiments, smoothly varying transmission power level profiles are used, e.g., as in FIG. 6.

In some embodiments, transmission from the relay station A 902 to its base station uses a different carrier frequency, e.g., F4, than transmissions from relay station A 902 to access terminals. In some embodiments, when relay station A 902 is transmitting to its base station on a particular carrier, it does not concurrently transmit to access terminals on the same carrier. In some embodiments, there are separate time intervals for transmissions from the relay station A 902 to access terminals and for transmissions from the relay station A 902 to its associated base station. In some such embodiments, the separate time intervals are non-overlapping.

Graph 1008, which corresponds to relay station B 904, includes vertical axis 1010 representing transmission power level and horizontal axis 1012 representing time. Legend 1014, previously described is also applicable with regard to graph 1008. Graph 1008, in view of the legend 1014, illustrates three exemplary power level variations over time.

In some embodiments, transmission from the relay station B 904 to its base station uses a different carrier frequency, e.g., F4, than transmissions from relay station B 904 to access terminals. In some embodiments, when relay station B 904 is transmitting to its base station on a particular carrier, it does not concurrently transmit to access terminals on the same carrier. In some embodiments, there are separate time intervals for transmissions from the relay station B 904 to access terminals and for transmissions from the relay station B 904 to its associated base station. In some such embodiments, the separate time intervals are non-overlapping.

It should be appreciated that the intentional use of different transmission power vs time profiles corresponding to the same carrier for adjacent relay stations is beneficial in mitigating interference when the adjacent relay stations are concurrently transmitting on the same carrier to access terminals. It may be observed that corresponding to a particular carrier, the transmission power level maximums occur at different time slots for the two different adjacent base stations. Coordinated different relay station transmission power level profiles in combination with intelligent selective access terminal scheduling can, and sometimes does, provide for increased throughput in the communications system. In some embodiments, the intelligent selective access terminal scheduling includes giving a preference in the scheduling decisions to schedule an access terminal situated in a relay station boundary area to receive transmissions from its relay station during a time interval of high transmission power. Selection of carrier and/or selection of scheduling time, in some embodiments, are used as part of the intelligent selective access terminal scheduling.

In the example of FIG. 10, AT A 912, which is situated in relay coverage area boundary region 910, has been scheduled by relay station A 902 to use type A time slot (1050, 1056) on carrier F3 as indicated by blocks (1070, 1072), respectively. For relay station A 902 type A time slots are for carrier F3 high power time slots where the transmission power level is P3. AT D 918 which is also situated in relay coverage area boundary region 910 has been scheduled by relay station B 904 to use type B time slot (1052, 1054) on carrier F3 as indicated by blocks (1082, 1084), respectively. For relay station B 904 type B time slots are for carrier F3 high power time slots where the transmission power level is P3.

AT B 914 and AT C 916 are away from a relay coverage area boundary and are scheduled to lower power time slots. More specifically, access terminal B has been scheduled by relay station A 902 to use type C time slot (1054, 1060) on carrier F3 as indicated by blocks (1078, 1080), respectively, which are medium power level (P2) time slots. Access terminal C 916 has been scheduled by relay station A 902 to use type B time slot (1052, 1058) on carrier F3 as indicated by blocks (1074, 1076), respectively, which are low power (P1) time slots.

AT E 920 and AT F 922 are away from a relay coverage area boundary and are scheduled to lower power time slots. More specifically, access terminal E 920 has been scheduled by relay station B 904 to use type C time slot (1054, 1060) on carrier F3 as indicated by blocks (1086, 1088), respectively, which are low power level (P1) time slots. Access terminal F 922 has been scheduled by relay station B 904 to use type A time slot (1050, 1056) on carrier F3 as indicated by blocks (1090, 1092), respectively, which are medium power (P2) time slots.

Although the example of FIG. 9 and FIG. 10 has been presented with regard to carrier F3, the scheduling may be extended to include additional access terminals being scheduled corresponding to the time slots for carriers F1 and/or F2. In some embodiments, access terminals can be, and sometimes are, switched between different carriers from one slot to another, as part of the scheduling. For example, access terminal A 912 may be switched from carrier F3 in slot A 1050 to carrier F2 for slot B 1052 to allocate more high power slots to access terminal A 912 than would otherwise be possible in the same time interval if access terminal A 1012 remained on the same carrier.

The techniques of various embodiments may be implemented using software, hardware and/or a combination of software and hardware. Various embodiments are directed to apparatus, e.g., relay stations, mobile nodes such as mobile access terminals, base stations including one or more attachment points, and/or communications systems. Various embodiments are also directed to methods, e.g., method of controlling and/or operating relay stations, mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, controlling transmission power based on at least one of time or frequency such that a transmission power level for a frequency is varied in a predetermined manner with time or such that different transmission power levels are used for different carrier frequencies; transmitting a signal to be relayed using the controlled transmission power level, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as relay stations, base stations, or wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems. At least some of the methods and apparatus are applicable to hybrid systems, e.g. a system including OFDM and CDMA signaling techniques.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes, between access nodes and relay station, and/or between relay stations and mobile nodes. In some embodiments the access nodes are implemented as base stations which establish communications links with mobile nodes and/or relay stations using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a relay station, comprising:
controlling transmission power used to transmit signals to access terminals based on at least one of time or frequency such that a transmission power level for a frequency is varied in a predetermined manner with time or such that different transmission power levels are used for different carrier frequencies;
controlling transmission power used to transmit signals to a base station to be at a the fixed power level, the fixed power level being used to transmit on a first carrier frequency to the base station being different from a power level used on said first carrier frequency to transmit to access terminals; and transmitting a signal to be relayed to one of a base station or an access terminal using the controlled transmission power.

2. The method of claim 1, further comprising:
providing a scheduling preference for access terminals at relay coverage area boundaries over access terminals away from said relay coverage area boundaries when a transmitter is controlled to use a high transmission power level.

3. The method of claim 1, further comprising:
providing, for access terminals at relay coverage area boundaries, a greater catrrier scheduling preference for a high power carrier frequency than is provided for access terminals away from said relay coverage area boundaries.

4. The method of claim 1,
wherein controlling transmission power used to transmit signals to the base station includes using the same transmission power level for multiple different carrier frequencies.

5. The method of claim 1, further comprising:
wherein controlling transmission power used to transmit signals to access terminals includes varying a transmission power level for a frequency over time in accordance with a predetermined pattern, said pattern being different from a different predetermined pattern used to vary transmission power in a physically adjacent relay station.

6. A relay station comprising:
at least one processor configured to:
control transmission power used to transmit signals to access terminals based on at least one of time or frequency such that a transmission power level for a frequency is varied in a predetermined manner with time or such that different transmission power levels are used for different carrier frequencies;
control transmission power used to transmit signals to a base station to be at a fixed power level, the fixed power level being used to transmit on a first carrier frequency to the base station being different from a power level used to transmit on said first carrier frequency to access terminals; and
transmit a signal to be relayed to one of a base station or an access terminal using the controlled transmission power; and
memory coupled to said at least one processor.

7. The relay station of claim 6, wherein said at least one processor is further configured to:
provide a scheduling preference for access terminals at relay coverage area boundaries over access terminals away from said relay coverage area boundaries when a transmitter is controlled to use a high transmission power level.

8. The relay station of claim 6, wherein said at least one processor is further configured to:
provide, for access terminals at relay coverage area boundaries, a greater carrier scheduling preference for a high power carrier frequency than is provided for access terminals away from said relay coverage area boundaries.

9. The relay station of claim 6, wherein said at least one processor is further configured to use the same transmission power level for multiple different carrier frequencies as part of being configured to control transmission power used to transmit signals to said base station.

10. The relay station of claim 6, wherein said at least one processor is further configured to:
control transmission power used to transmit signals to access terminals by varying a transmission power level for a frequency over time in accordance with a predetermined pattern, said pattern being different from a different predetermined pattern used to vary transmission power in a physically adjacent relay station.

11. A relay station comprising:
means for controlling transmission power used to transmit signals to access terminals based on at least one of time or frequency such that a transmission power level for a frequency is varied in a predetermined manner with time or such that different transmission power levels are used for different carrier frequencies;
means for controlling transmission power used to transmit signals to a base station to be at a fixed power level, the fixed power level being used to transmit on a first carrier frequency to the base station being different from a power level used on said first carrier frequency to transmit to access terminals; and
means for transmitting a signal to be relayed to one of a base station or an access terminal using the controlled transmission power.

12. The relay station of claim 11 further comprising:
means for providing a scheduling preference for access terminals at relay coverage area boundaries over access terminals away from said relay coverage area boundaries when a transmitter is controlled to use a high transmission power level.

13. The relay station of claim 11 further comprising:
means for providing, for access terminals at relay coverage area boundaries, a greater carrier scheduling preference for a high power carrier frequency than is provided for access terminals away from said relay coverage area boundaries.

14. The relay station of claim 11
wherein said means for controlling transmission power used to transmit signals to said base station controls the relay station to use the same transmission power level for multiple different carrier frequencies for transmitting to said base station.

15. The relay station of claim 11,
wherein said means for controlling transmission power used to transmit signals to access terminals controls a transmission power level for a frequency to vary over time in accordance with a predetermined pattern said pattern being different from a different predetermined pattern used to vary transmission power in a physically adjacent relay station.

16. A computer program product for use in a relay station, the computer program product comprising:
a non-transitory computer readable medium comprising:
code, which when executed by at least one computer controls transmission power used to transmit signals to access terminals based on at least one of time or frequency such that a transmission power level for a frequency is varied in a predetermined manner with time or such that different transmission power levels are used for different carrier frequencies;
code which when executed by the at least one computer controls transmission power used to transmit signals to a base station to be at a fixed power level, the fixed power level being used to transmit on a first carrier frequency to the base station being different from a power level used on said first carrier frequency to transmit to access terminals; and code, which when executed by said at least one computer, controls the computer to transmit a signal to be relayed to one of a base station or an access terminal using the controlled transmission power.

17. The computer program product of claim 16, wherein the non-transitory computer readable medium further comprises:
code, which when executed by said at least one computer controls said at least one computer to provide a scheduling preference for access terminals at relay coverage area boundaries over access terminals away from said relay coverage area boundaries when a transmitter is controlled to use a high transmission power level.

18. The computer program product of claim 16, wherein the non-transitory computer readable medium further comprises:
code, which when executed by said at least one computer controls said at least one computer to provide, for access terminals at relay coverage area boundaries, a greater carrier scheduling preference for a high power carrier frequency than is provided for access terminals away from said relay coverage area boundaries.

19. The computer program product of claim 16, wherein the code for causing said at least one computer to control transmission power used to transmit signals to a base station includes code for causing the at least one computer to use the same transmission power level for multiple different carrier frequencies.

20. The computer program product of claim 16,
wherein said code for causing at least one computer to control transmission power used to transmit signals to access terminals controls transmission power level used to transmit signals on a frequency to vary over time in accordance with a predetermined pattern, said pattern being different from a different predetermined pattern used to vary transmission power in a physically adjacent relay station.

* * * * *